(12) United States Patent
Lenges et al.

(10) Patent No.: US 8,212,148 B1
(45) Date of Patent: Jul. 3, 2012

(54) COMPOSITIONS COMPRISING ETHYLENE COPOLYMER

(75) Inventors: Geraldine M. Lenges, Wilmington, DE (US); David C. Urian, Pennsville, NJ (US)

(73) Assignee: E I du Pont de Nemours and Company, Wilmington, DE (US)

( * ) Notice: Subject to any disclaimer, the term of this patent is extended or adjusted under 35 U.S.C. 154(b) by 254 days.

(21) Appl. No.: 12/362,064

(22) Filed: Jan. 29, 2009

Related U.S. Application Data

(63) Continuation-in-part of application No. 11/298,042, filed on Dec. 9, 2005, now abandoned.

(60) Provisional application No. 60/635,165, filed on Dec. 10, 2004.

(51) Int. Cl.
  *H01B 3/30* (2006.01)
  *H01B 3/44* (2006.01)
  *H01B 7/00* (2006.01)
  *H01B 7/295* (2006.01)

(52) U.S. Cl. .......... 174/110 R; 174/119 C; 174/121 SR; 174/110 SR

(58) Field of Classification Search .............. 174/110 R, 174/119 C, 121 SR, 110 SR
See application file for complete search history.

(56) References Cited

U.S. PATENT DOCUMENTS

| | | | |
|---|---|---|---|
| 4,386,172 A | 5/1983 | Yoshioka | |
| 5,360,830 A | 11/1994 | Bastiolo | |
| 5,641,562 A | 6/1997 | Larson | |
| 6,278,826 B1 | 8/2001 | Sheu | |
| 6,355,733 B1 | 3/2002 | Williams | |
| 6,429,261 B1 | 8/2002 | Lang | |
| 6,677,394 B1 | 1/2004 | Butterbach | |
| 6,713,414 B1 | 3/2004 | Pumplun | |
| 6,740,396 B2 | 5/2004 | Carrus | |
| 6,911,258 B1 | 6/2005 | Prigent | |
| 6,998,538 B1 * | 2/2006 | Fetterolf, Sr. et al. | .... 174/113 R |
| 2003/0008158 A1 | 1/2003 | Carrus | |
| 2004/0078015 A1 | 4/2004 | Copat | |
| 2006/0128896 A1 | 6/2006 | Lenges | |

FOREIGN PATENT DOCUMENTS

| | | |
|---|---|---|
| EP | 0255050 A2 | 2/1988 |
| WO | 9008806 A1 | 8/1990 |
| WO | 9825974 A1 | 6/1998 |
| WO | 0207791 A1 | 1/2002 |
| WO | 03079946 A1 | 10/2003 |
| WO | 2004043156 A1 | 5/2004 |

\* cited by examiner

*Primary Examiner* — Nathan M Nutter

(57) ABSTRACT

An article comprises a plurality of core tubes having coated thereon an insulating wall, a water-blocking layer, a conduit, and an outer jacket. The core tube comprises one or more conductors and is each surrounded by the insulating wall. The core tube can be wrapped with the insulating wall by any means known to one skilled in the art similar to electrical wire making. The insulating wall can be surrounded by the water-blocking layer. The role of the insulating wall is to protect the conductors from external mechanical damage, moisture penetration, and to provide electrical insulation. Such wall can comprise a continuous matrix, generally made of a polymer, optionally containing filler particles that may be inorganic.

20 Claims, 1 Drawing Sheet

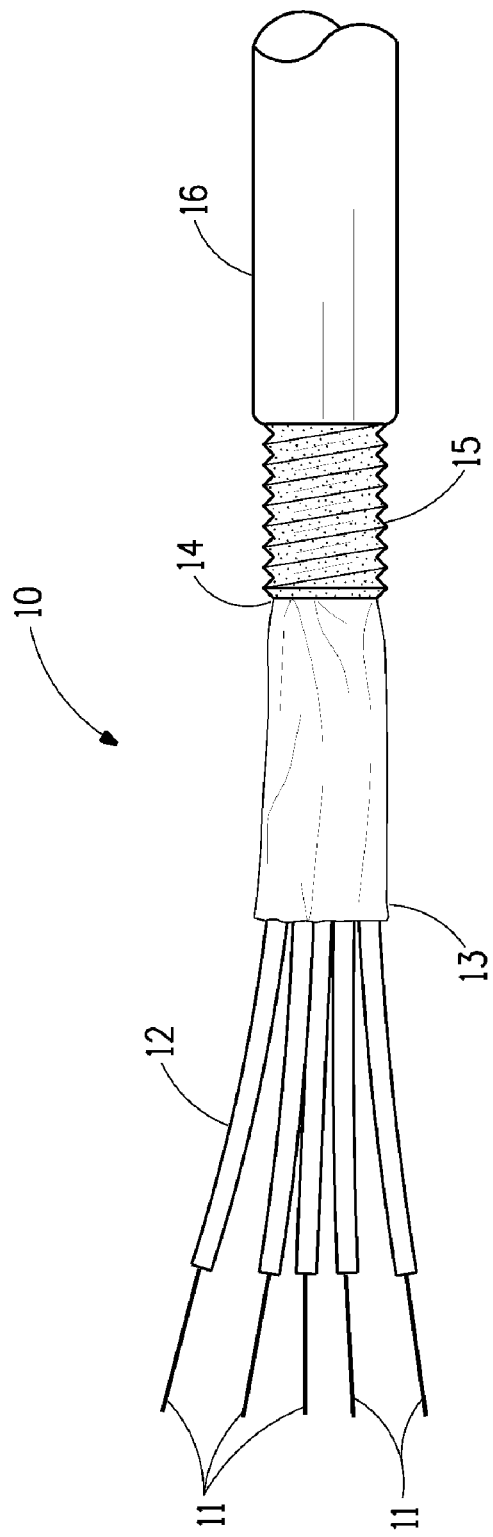

COMPOSITIONS COMPRISING ETHYLENE COPOLYMER

This application is a continuation-in-part of application Ser. No. 11/298,042, filed Dec. 9, 2005, which claims priority of U.S. provisional application Ser. No. 60/635,165, filed Dec. 10, 2004, the entire disclosures of both applications are incorporated herein by reference.

The invention relates to an article comprising a composition which comprises an ethylene copolymer.

BACKGROUND OF THE INVENTION

A cable is made from one or more wires which can be conductive. The conductor can conduct data, heat, light, or electricity and can be metal conductive material or fiber optics (conductor of light). The cable can have an insulated wall which can be a coating surrounding the conductor. This insulated wall isolates the electricity, optics, or heat passing through the conductor from the surrounding environment.

Cable is generally used in telecommunications or electrical power. If water enters the cable, water can corrode the metal part of the cable thereby damaging or impairing the telecommunications or power delivery. Water can also freeze within the cable thereby inducing microbending in the optical fibers of the cable, which consequently can result in fiber degradation or increased signal loss. A water-blocking or water-absorbing product can be used to prevent or reduce the potential water damage or transmission impairment. For example, water-blocking material is disposed in any otherwise empty space within a fluid impervious tube surrounding a plurality of optical fibers and between the outer layer and the tube. Also for example, water-blocking material is disposed between the transmission media and the outer jacket of the cable. As a further example, U.S. Pat. No. 6,278,826 discloses incorporating in cables a water-blocking foam with flame-retarding characteristics. As a further example, WO 98/25974 discloses using hydrophilic zeolites to remove residual acids or small esters from polymeric compositions.

It is highly desirable to provide an alternative water-blocking and/or absorbing "medium" in the form of, for example, a film that can be laminated to another portion of the cable structure.

SUMMARY OF THE INVENTION

The invention includes a composition that can be used to absorb water. The composition can comprise or be produced from a first polymer, a second polymer, and optionally a third polymer in which the first polymer can comprise repeat units derived from ethylene and at least one polar monomer; the second polymer can be a polyacrylic acid or polymethacrylic acid, salt thereof, cross-linked polymer thereof, or combinations of two or more thereof, and the third polymer can be polyvinyl alcohol, polyacrylamide, partially hydrolyzed polyacrylamide, or combinations of two or more thereof.

The invention also includes an article such as cable, electrical wire or electronic wire and the article can comprise a plurality of core tubes, insulating wall, a water-blocking layer, a conduit, and an outer jacket wherein the article is cable, electrical wire, or electronic wire; the core tube comprises one or more conductors and is each surrounded by the insulating wall; the insulating wall is surrounded by the water-blocking layer; the metal conduit surrounds the water-blocking layer; the conduit has coated thereon a fourth polymer layer; the outer jacket disposes around the conduit; the water-blocking layer is a film or sheet or tape; the water-blocking layer comprises or is produced from a water-adsorbing polymer; and the fourth polymer comprises or is produced from a composition disclosed above.

Also included is a process that can be used to block or absorb water in an article. The process can comprise contacting an article such as a cable with a composition wherein the composition can be as disclosed above.

BRIEF DESCRIPTION OF THE DRAWING

FIG. 1 shows a cable comprising a plurality of core tubes, insulating wall, a water-blocking layer, a conduit, and an outer jacket.

DETAILED DESCRIPTION OF THE INVENTION

The first polymer is commonly referred to as an ethylene copolymer or ethylene acid polymer or ethylene polymer and can include an ionomer of the polymer. An ethylene copolymer is a copolymer comprising repeat units derived from ethylene and at least one polar monomer. The repeat units derived from the polar monomer can be present in the range of about 5 to about 50%, or about 10 to about 19%, or 12 to 15%, all weight percent (wt %) of the copolymer weight. A polar monomer can include acrylic acid, methacrylic acid, vinyl acetate, alkyl acrylate, or combinations of two or more thereof, based on the total weight of the ethylene copolymer. The alkyl group may contain up to about 20 carbon atoms such as methyl, ethyl, butyl, isobutyl, pentyl, hexyl, and combinations of two or more thereof.

Examples of such polar monomers include acrylic acid, methacrylic acid, ethacrylic acid, methyl acrylate, ethyl acrylate, methyl methacrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, 2-hydroxyethyl methacrylate, vinyl acetic acid, vinyl acetate, vinyl propionate, and combinations of two or more thereof.

An ethylene copolymer may comprise up to 35 wt % of an optional comonomer such as carbon monoxide, sulfur dioxide, acrylonitrile; maleic anhydride, dimethyl maleate, diethyl maleate, dibutyl maleate, dimethyl fumarate, diethyl fumarate, dibutyl fumarate, dimenthyl fumarate, maleic acid, maleic acid monoesters, itaconic acid, fumaric acid, fumaric acid monoester, a salt of these acids, glycidyl acrylate, glycidyl methacrylate, and glycidyl vinyl ether, and combinations of two or more thereof.

The acid moiety of an ethylene copolymer may be neutralized with a cation to produce an ionomer. The neutralization, for example, can range from about 0.1 to about 100, or about 10 to about 90, or about 20 to 80, or about 20 to about 40 percent, based on the total carboxylic acid content, with a metallic ion. The metallic ions can be monovalent, divalent, trivalent, multivalent, or combinations of two or more thereof. Examples include Li, Na, K, Ag, Hg, Cu, Be, Mg, Ca, Sr, Ba, Cd, Sn, Pb, Fe, Co, Zn, Ni, Al, Sc, Hf, Ti, Zr, Ce, and combinations of two or more thereof. If the metallic ion is multivalent, a complexing agent, such as stearate, oleate, salicylate, and phenolate radicals can be included, as disclosed in U.S. Pat. No. 3,404,134. Frequently used include Na, Zn, or combinations thereof.

The ionomer can also be a blend of an ionomer having a greater than 20% neutralization and, for example, an ethylene (alkyl)acrylic acid copolymer to achieve the desired degree of neutralization.

For example, an ethylene alkyl acrylate copolymer can comprise from 1 to 30 weight % of at least one E/X/Y copolymer wherein E comprises ethylene; X is a monomer selected from the group consisting of vinyl acetate and alkyl acrylic esters; and Y is one or more optional comonomers disclosed above; X is from 0 to 50 weight % of the E/X/Y copolymer, Y is from 0 to 35 weight % of the E/X/Y copolymer, wherein the weight % of X and Y cannot both be 0, and E being the remainder.

Examples of ethylene copolymers include, but are not limited to, ethylene/acrylic acid (EAA), ethylene/vinyl acetate (EVA), ethylene/methyl acrylate (EMA), ethylene/ethyl acrylate (EEA), ethylene/butyl acrylate (EBA), ethylene/isobutyl acrylate (EiBA), ethylene/isobutyl acrylate/methacrylic acid, ethylene/methyl acrylate/maleic anhydride, ethylene/butyl acrylate/glycidyl methacrylate (EBAGMA), ethylene/butyl acrylate/carbon monoxide (EBACO), and combinations of two or more thereof.

Examples of commercially available ethylene copolymers include those available from E. I. du Pont de Nemours and Company (DuPont), Wilmington, Del. carrying the trademarks of Surlyn®, Nucrel®, Appeel®, Bynel®, Elvaloy®, and Elvax®.

Such ethylene copolymers can be produced by any means known to one skilled in the art using either autoclave or tubular reactors (e.g., U.S. Pat. No. 3,404,134, U.S. Pat. No. 5,028,674, U.S. Pat. No. 6,500,888 and U.S. Pat. No. 6,518,365).

For example, an ethylene copolymer can be produced at high pressure and elevated temperature in a tubular reactor. The inherent consequences of dissimilar reaction kinetics for the respective ethylene and alkyl acrylate (e.g. methyl acrylate) comonomers is alleviated or partially compensated by the intentional introduction of the monomers along the reaction flow path within the tubular reactor. Such tubular reactor-produced ethylene copolymer has a greater relative degree of heterogeneity along the polymer backbone (a more blocky distribution of comonomers), reduced long chain branching, and a higher melting point than one produced at the same comonomer ratio in a high pressure stirred autoclave reactor. For additional information for tubular reactor-produced and autoclave produced ethylene copolymers, see Richard T. Chou, Mimi Y. Keating and Lester J. Hughes, "*High Flexibility EMA made from High Pressure Tubular Process*", Annual Technical Conference—Society of Plastics Engineers (2002), 60th(Vol. 2), 1832-1836. Tubular reactor produced ethylene copolymers are commercially available from DuPont.

The ionomers can be blended or melt-blended with other ionomers or polymers and/or modified by incorporation of organic acids or salts thereof. The organic acids or salts thereof, such as those particularly aliphatic, mono-functional organic acid(s) can have from 6 to 36 carbon atoms per molecule. The organic acids can be one or more at least partially neutralized, aliphatic, mono-functional organic acids having fewer than 36 carbon atoms or salt thereof. Also, greater than 80% or greater than 90% or even 100% of all the acid components in the blend can be neutralized. As disclosed above, the acids in the ionomer are at least partially neutralized by, for example, potassium ions. The organic acids can be non-volatile and non-migratory. Examples of organic acids are lauric acid, palmitic acid, stearic acid, oleic acid, erucic acid, behenic acid, or combinations of two or more thereof. These acids are also referred to as fatty acids.

The organic acids or salts thereof can be added in an amount sufficient to enhance the antistatic, gas permeation and antifog properties of the copolymer or ionomer over the non-modified copolymer ionomer such as at least about 5 wt %, or at least 15 wt %, or even 30 wt %, up to about 50 wt % of the total amount of copolymer (or ionomer) and organic acid(s).

Polyacrylic acid or polymethacrylic acid or salt thereof or cross-linked polymer thereof can be in powder or granule form. Polyacrylic acid or polymethacrylic acid or salt thereof or cross-linked polymer thereof is well known to one skilled in the art. The description of which is omitted herein for the interest of brevity. Examples of salts of polyacrylic acid or polymethacrylic acid can include ammonium or a metal salt such as a sodium salt of polyacrylic acid or polymethacrylic acid, which can be readily available from Aldrich Chemical, Milwaukee, Wis. or Sumitomo Seika Chemicals Co., Ltd, Japan.

The third polymer can be polyvinyl alcohol, polyacrylamide, partially hydrolyzed polyacrylamide, or combinations of two or more thereof. These polymers are well known to one skilled in the art and can be commercially available.

The composition can comprise the second polymer in the range of from about 1 to about 95 wt %, or about 5 to about 80 wt %, or about 10 to about 70 wt %, or 40 to 60 wt %, based on the weight of the composition. If the composition includes the third polymer such as polyvinyl alcohol or derivative thereof, the third polymer can be present in the range from about 1 to about 60 wt %, about 2 to about 50 wt %, or about 5 to about 40 wt %.

The composition can be produced by any means known to one skilled in the art such as, for example, dry blending, melt blending, extrusion, or combinations of two or more thereof. Because such means are well known to one skilled in the art, the description of which is omitted herein for the interest of brevity. In addition, a polymer melt obtained after extrusion can be cooled by air or cooled without water. A polymer melt can also be cooled on a moving belt under an inert gas such as nitrogen or a series of air ladders or air ring. A polymer melt can be optionally further cooled with dry ice, liquid nitrogen, or other means or aids to allow for sufficient cutting and pelletizing.

The composition can be in the form of powder, granule, pellet, film, multilayer film, or combinations of two or more thereof.

A shaped article can be produced from the composition. The shaped article may be in the form of films, sheets, filaments, tapes, molded products, thermoformed products, and containers for food or non-food packaging. Processes for producing these products are well known to one skilled in the art. For example, films can be produced by methods known to one skilled in the art such as, for example, solution casting, cast film extrusion, blown film extrusion, and thermoplastic film forming (e.g., calendering or stretching). Films can be oriented in one direction by hot-drawing in the machine direction with a tensioning device, and annealing. Films can also be oriented in two directions (machine direction and transverse direction) by suitable tensioning devices. Because such methods are well known to one skilled in the art, the description of which is omitted herein for the interest of brevity.

Films can also be multilayer films produced by laminating one or more films together either by lamination, coextrusion, or using adhesives. For example, a multilayer polymer film can involve two or more layers including an outermost structural layer, an inner barrier layer, and an innermost layer making contact with and compatible with the intended contents of the package and capable of forming seals necessary for enclosing the product to be contained within the package.

Films can be made by any method of film forming known to those skilled in this art. The film can be either a single layer or multilayer polymeric film. As such, the film and film structures can be cast, extruded, co-extruded and the like including orientation (either uniaxially or biaxially) by various methodologies (e.g., blown film, mechanical stretching or the like). Various additives as generally practiced in the art can be present in the respective film layers including the presence of tie layers and the like, provided their presence does not substantially alter the properties of the film or film structure. Thus, it is contemplated that various additives such as antioxidants and thermal stabilizers, ultraviolet (UV) light stabilizers, pigments and dyes, fillers, delustrants, anti-slip agents, plasticizers, other processing aids, and the like may be employed.

For example, a primary film can be made by extruding the compositions using so-called "blown film" or "flat die" methods. A blown film is prepared by extruding the polymeric composition through an annular die and expanding the resulting tubular film with an air current to provide a blown film. Cast flat films are prepared by extruding the composition through a flat die. The film leaving the die is cooled by at least one roll containing internally circulating fluid (a chill roll) or by a water bath to provide a cast film. A film can have any width such as, for example, of about 60 cm (two feet). Films can be made wider or narrower for certain purposes.

The film can be used to make a container, which is a shaped article for use in packaging and includes box, blister pack, bottle, tray, cup, and other containers. Containers can be used for beverages, foods (e.g., meats, cheese, fish, poultry, nuts, and other edible items), spices, condiments, personal care products, fragrances, electronic components, medical devices, medicinal liquids, pharmaceuticals, and cosmetics.

Tapes may be produced from extruded films. Flat films can be extruded into a cooling water bath or onto chilled rolls for quenching. Alternatively, a tubular blown film can be extruded through an annular die and air-quenched. The quenched film is then knife-slit into tapes. The tapes can be then stretched (i.e. uniaxially oriented) to several times their original length by hot-drawing in the machine direction with a tensioning device and annealing the stretched tapes having controlled widths (for example from about 1 cm to about 5 cm). Tapes can be used in a number of applications. For example, tapes can be coated with a variety of appropriate adhesives to prepare adhesive tapes.

Also a nonoriented film can be slit into slit film tapes that are drawn before being reeled up. The slit film tapes can be produced with a slitting apparatus which comprises a support frame; a plurality of substantially planar cutting blades, each of which includes opposed cutting edges and opposed ends; a mounting structure for mounting the cutting blades to the support frame; and a feed roll attached to the support frame and configured to feed film in a downstream direction over the exposed cutting edges of the blades. The mounting structure can be configured to mount the cutting blades in substantially aligned, parallel and spaced apart relationship, the blades are mounted such that each blade has one of its cutting edges exposed for cutting, and wherein the cutting edges of adjacent blades are spaced apart from each other.

After slitting the film into tapes, the drawing operation would be done over a span of from 3 to 6 meters (ten to twenty feet) in an oven heated to a temperature effective to soften the film so as to facilitate the drawing operation. What typically takes place is that the film, at the beginning of the path through the oven is cold and is progressively heated and softened as it passes through the oven. Necking takes place at a neckline that is at a certain distance from the entrance to the oven. The location of the necking zone depends on a number of factors including the rate of stretching, the temperature of the oven, and the nature and thickness of the film material. A typical pre-stretched tape may have, for example, a thickness about 120 microns and a width of about 3 cm to about 15 cm. After stretching, the final tape has a thickness of about 30 to 50 microns and a width of about 1 cm to about 5 cm. Tapes can be made wider or narrower for certain purposes.

The drawing ratio can generally be in the range of from about 2:1 to about 16:1 and a typical drawing ratio for some compositions would be from about 4:1 to about 10:1. The distance over which longitudinal drawing takes place can vary with the technique used. In the short-draw the stretching takes place over a distance of a few inches, other techniques involve much greater distances.

An article disclosed here can be cable, electrical wire, or electronic wire. As shown in FIG. 1, the article (10) can comprise a plurality of core tubes (12) having coated thereon an insulating wall, optionally a water-blocking layer (13), a metal conduit (14), and an outer jacket (16). The core tube comprises one or more conductors (11) and is each surrounded by the insulating wall. The conductor (11) can be either any metal or optical fiber. The core tube can be made with any conventional materials known to one skilled in the art and be wrapped with the insulating wall by any means known to one skilled in the art similar to electrical wire or optical fiber making. The insulating wall can be surrounded by the water-blocking layer. The role of the insulating wall is to protect the conductors from external mechanical damage, moisture penetration, and to provide electrical insulation. Such wall can comprise a continuous matrix, generally made of a polymer, optionally containing filler particles that may be inorganic.

The water-blocking layer can be a film or sheet or tape and can comprise or be produced from a water-adsorbing polymer. The water-adsorbing polymer can be any water-adsorbing polymer known to one skilled in the art such as, for example, polyacrylates, polyacrylamides, polyvinylalcohols, co-polymers of polyacrylates, co-polymers of polyacrylamides, co-polymers of polyvinylalcohols, co-polymers of polyacrylates and polyacrylamides, co-polymers of polyacrylates and polyvinylalcohols, co-polymers of polyacrylamides and polyvinylalcohols, or combinations of two or more thereof. The water-adsorbing polymer can also comprise or be produced from a composition disclosed above.

The metal conduit surrounds the water-blocking layer and can be steel, stainless steel, aluminum, or other metal. The conduit has coated thereon polymer composition (15) disclosed above. The polymer can be laminated onto the surface of the conduit be any means known in the art and can be directly laminated or coated onto the conduit without an intervening adhesive. Preferably, the polymer layer is coextruded onto the conduit by any means known to one skilled in the art.

The outer jacket disposes around the conduit to protect the conduit and can be any known insulating material the insulating wall disclosed above.

Alternatively, instead of coating the polymer on the conduit, the polymer can be coated in the inside wall of the outer jacket.

The article can be used for transmission or distribution of power or data under any conditions. One of the articles can be a cable. For examples, cables can be uses for long distance transmission of a cellular or free structure or a ribbon structure. Cable refers to the one used in telecommunication or power delivery or both. A telecommunication cable can include a core tube fixedly surrounded by an outer jacket. The outer jacket can be made from plastics or other similar material. The core tube can include a transmission medium such as optical fiber such as that disclosed in U.S. Pat. No. 6,278,826, which is incorporated herein by reference.

EXAMPLES

The following examples are provided to illustrate, but are not to be construed to unduly limit the scope of, the invention.

Example 1

Aquakeep 10HSNF20 (Sodium salt of polyacrylic acid available from Sumitomo Seika Chemicals Co., Ltd, Japan), Elvax® (ethylene vinyl acetate copolymer available from DuPont) and Elvanol® (ethylene vinyl alcohol copolymer available from DuPont) were compounded on a 28 mm Werner and Pfleiderer twin-screw extruder and cast into 2 mil (0.51 mm) film from a 10 inch (25.4 cm) flat die. The compositions are shown in Table 1.

TABLE 1 films of compositions comprising Elvax ®

| Run No. | 10 SHNF20 (wt %) | Elvax ® (wt %)[A] | Other (wt %) |
|---|---|---|---|
| 1 | 15 | 85 (Elvax ® 40) | 0 |
| 2 | 15 | 85 (Elvax ® 3180) | 0 |
| 3 | 15 | 63.75 (Elvax ® 3180) | 21.25 (Elvanol ® 75-15)[B] |
| 4 | 30 | 70 (Elvax ® 3180) | 0 |
| 5 | 15 | 83 (Elvax ® 3180) | 2 (Safoam ® RPC-40)[C] |
| 6 | 40 | 60 (Elvax ® 3175) | 0 |
| 7 | 50 | 50 (Elvax ® 3175) | 0 |
| 8 | 60 | 40 (Elvax ® 3175) | 0 |

[A]Elvax ® 40: polymer comprising repeat units derived from 60 wt % ethylene and 40 wt % vinyl acetate having a melt index (MI) of 52; Elvax ® 3175: polymer comprising repeat units derived from 72 wt % ethylene and 28 wt % vinyl acetate, 6 MI; Elvax ® 3180: polymer comprising repeat units derived from 72 wt % ethylene and 28 wt % vinyl acetate having a MI of 40.
[B]Elvanol ® 75-15: fully hydrolyzed polymer comprising repeat units derived from polyvinyl alcohol and methyl methacrylate having a degree of polymerization of 1000, obtained from DuPont.
[C]Safoam ® RPC-40: foaming agent available from Reedy International Corporation.

Method a: The weight % absorption was determined by ASTM D570-7.2 by placing the conditioned specimen in a container of distilled water maintained at a temperature of 23° C., and resting the specimen on edge and entirely immersing the specimen. At the end of 2 hours, the specimen was removed from water, all surface water was wiped off with a dry cloth, and the dry cloth-dried specimen was immediately weighed to the nearest 0.001 g.

Method b: The weight % absorption was determined by placing the conditioned specimen in a cup or beaker of 100 g of distilled water and entirely immersing the specimen. At the end of 2 minutes (b1) or 2 hours (b2), the specimen and water were poured into a funnel containing presoaked filter paper and allowed to drain into a clean cup or beaker. The mixture was allowed to drain for fifteen minutes. The water was immediately weighed to the nearest 0.001 g.

The results are shown in Table 2.

TABLE 2 water absorption of film comprising Elvax ®

| Run No | 10SHNF20 (wt %) | Water Absorption (wt % increase)* |
|---|---|---|
| Elvax ® 3175 Control | 0 | 0.42$^a$ |
| 1 | 15 | 65$^a$ |
| 2 | 15 | 9.8$^a$ |
| 3 | 15 | 84$^a$ |

TABLE 2-continued water absorption of film comprising Elvax ®

| Run No | 10SHNF20 (wt %) | Water Absorption (wt % increase)* |
|---|---|---|
| 4 | 30 | 159$^a$ |
| 5 | 15 | 9$^a$ |
| 6 | 40 | 158$^{b1}$, 220$^{b2}$ |
| 7 | 50 | 589$^{b1}$, 773$^{b2}$ |
| 8 | 60 | 1059$^{b1}$, 1378$^{b2}$ |

*"a" denotes results obtained using method a and "b" denotes results obtained using method b after immersing specimen 2 minutes (b1) or 2 hours (b2).

The invention claimed is:

1. An article comprising a plurality of core tubes, a water-blocking layer, a metal conduit, and an outer jacket wherein
   the article is cable, electrical wire, or electronic wire;
   the core tube comprises one or more conductors;
   each conductor is surrounded by an insulating wall;
   the insulating wall is surrounded by the water-blocking layer;
   the metal conduit surrounds the water-blocking layer;
   the metal conduit optionally has coated thereon a fourth polymer layer;
   the outer jacket disposes around the metal conduit;
   the water-blocking layer is a film or sheet or tape;
   the water-blocking layer comprises or is produced from a water-adsorbing polymer; and
   the fourth polymer comprises or is produced from a first polymer, a second polymer, and optionally a third polymer; the first polymer comprises an ethylene copolymer; the second polymer comprises a polyacrylic acid or its salt or cross-linked polymer thereof, a polymethacrylic acid or its salt or cross-linked polymer thereof, or combinations of two or more thereof; and the third polymer comprises polyvinyl alcohol, polyacrylamide, partially hydrolyzed polyacrylamide, or combinations of two or more thereof.

2. The article of claim 1 wherein the ethylene copolymer includes ethylene vinyl acetate copolymer, ethylene acrylic acid copolymer, ethylene methacrylic acid copolymer, ethylene methyl acrylate copolymer, ethylene ethyl acrylate copolymer, ethylene methyl methacrylate copolymer, ethylene propyl acrylate copolymer, ethylene butyl acrylate copolymer, ethylene butyl methacrylate copolymer, or combinations of two or more thereof.

3. The article of claim 2 wherein the water-adsorbing polymer is polyacrylate, polyacrylamide, polyvinylalcohol, polyacrylate, the fourth polymer, or combination of two or more thereof; the metal conduit has coated thereon the fourth polymer layer; and the fourth polymer layer is in contact with the metal conduit without an intervening adhesive.

4. The article of claim 2 wherein the conductor comprises metal wire or optical fiber; the metal conduit has coated thereon the fourth polymer layer; and the fourth polymer layer and the metal conduit are coextruded.

5. The article of claim 4 wherein the article is the cable; the conductor comprises the optical fiber; and the fourth layer comprises or is produced from an ethylene vinyl acetate copolymer and a polyacrylic acid or its salt or cross-linked polymer thereof, a polymethacrylic acid or its salt or cross-linked polymer thereof, or combinations of two or more thereof.

6. The article of claim 5 wherein the fourth layer comprises or is produced from an ethylene vinyl acetate copolymer and a salt or cross-linked polymer of polyacrylic acid, a salt or cross-linked polymer of polymethacrylic acid, or combinations of two or more thereof.

7. The article of claim 3 wherein the water-adsorbing polymer is the fourth polymer.

8. The article of claim 7 wherein
the conductor comprises metal wire or optical fiber; and
the fourth polymer layer is in contact with the metal conduit without an intervening adhesive.

9. The article of claim 8 wherein the fourth polymer layer and the metal conduit are coextruded.

10. The article of claim 9 wherein the article is the cable; the conductor comprises the optical fiber; and the fourth layer comprises or is produced from an ethylene vinyl acetate copolymer and a polyacrylic acid or its salt or cross-linked polymer thereof, a polymethacrylic acid or its salt or cross-linked polymer thereof, or combinations of two or more thereof.

11. The article of claim 10 wherein the fourth layer comprises or is produced from an ethylene vinyl acetate copolymer and a salt or cross-linked polymer of polyacrylic acid, a salt or cross-linked polymer of polymethacrylic acid, or combinations of two or more thereof.

12. The article of claim 6 wherein the water-blocking layer is a tape.

13. The article of claim 12 wherein the water-blocking layer further comprises the third polymer.

14. The article of claim 13 wherein the jacket further comprises a flame retardant.

15. The article of claim 13 wherein the third polymer is polyvinyl alcohol.

16. The article of claim 10 wherein the water-blocking layer is a tape.

17. The article of claim 16 wherein the water-blocking layer further comprises the third polymer.

18. The article of claim 17 wherein the jacket further comprises a flame retardant.

19. The article of claim 17 wherein the third polymer is polyvinyl alcohol.

20. An article comprising a plurality of core tubes, insulating wall a water-blocking layer, a metal conduit, and an outer jacket wherein
the article is cable;
the core tube comprises one or more conductors and is each surrounded by the insulating wall;
the conductor is optical fiber;
the insulating wall is surrounded by the water-blocking tape which comprises ethylene vinyl acetate copolymer and a salt or cross-linked polymer of polyacrylic acid, a salt or cross-linked polymer of polymethacrylic acid, or combinations of two or more thereof;
the metal conduit surrounds the water-blocking layer and has directly laminated thereon a fourth polymer layer; and
the fourth polymer comprises or is produced from ethylene vinyl acetate copolymer and a salt or cross-linked polymer of polyacrylic acid, a salt or cross-linked polymer of polymethacrylic acid, or combinations of two or more thereof.

* * * * *